(12) United States Patent
Maani

(10) Patent No.: US 11,422,635 B2
(45) Date of Patent: Aug. 23, 2022

(54) OPTICAL SENSING DEVICE

(71) Applicant: Apple Inc., Cupertino, CA (US)

(72) Inventor: Ehsan Maani, Monte Sereno, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/169,048

(22) Filed: Feb. 5, 2021

(65) Prior Publication Data

US 2021/0157414 A1 May 27, 2021

Related U.S. Application Data

(63) Continuation of application No. 15/117,692, filed as application No. PCT/US2014/015647 on Feb. 10, 2014.

(51) Int. Cl.
| | |
|---|---|
| *G06F 3/01* | (2006.01) |
| *G06F 1/16* | (2006.01) |
| *G06F 3/00* | (2006.01) |

(52) U.S. Cl.
CPC .............. *G06F 3/017* (2013.01); *G06F 1/163* (2013.01); *G06F 1/1686* (2013.01); *G06F 3/005* (2013.01); *G06F 3/014* (2013.01)

(58) Field of Classification Search
CPC .......... G06F 3/017; G06F 3/014; G06F 1/163; G06F 1/1686; G06F 3/005; G06F 3/0304
See application file for complete search history.

(56) References Cited

U.S. PATENT DOCUMENTS

| | | | |
|---|---|---|---|
| 4,819,197 A * | 4/1989 | Blais | G06F 7/544 250/214 DC |
| 6,738,044 B2 | 5/2004 | Holzrichter et al. | |

(Continued)

FOREIGN PATENT DOCUMENTS

| | | |
|---|---|---|
| CN | 101655739 | 2/2010 |
| CN | 102301314 | 12/2011 |

(Continued)

OTHER PUBLICATIONS

Luo et al., "Design and Implementation of Interaction & Control Module for Data Glove Based on WTK," Institute of Computer Application, CAEP, Mianyang Sichuan 621900, China, Aug. 30, 2004, 5 pages.

*Primary Examiner* — Chad M Dicke
(74) *Attorney, Agent, or Firm* — Brownstein, Hyatt, Farber, Schreck, LLP

(57) ABSTRACT

A wearable device with an optical sensor is disclosed that can be used to recognize gestures of a user wearing the device. Light sources can be positioned on the back or skin-facing side of a wearable device, and an optical sensor can be positioned near the light sources. During operation, light can be emitted from the light sources and sensed using the optical sensor. Changes in the sensed light can be used to recognize user gestures. For example, light emitted from a light source can reflect off a wearer's skin, and the reflected light can be sensed using the optical sensor. When the wearer gestures in a particular way, the reflected light can change perceptibly due to muscle contraction, device shifting, skin stretching, or the distance changing between the optical sensor and the wearer's skin. Recognized gestures can be interpreted as commands for interacting with the wearable device.

15 Claims, 7 Drawing Sheets

(56) References Cited

U.S. PATENT DOCUMENTS

| | | |
|---|---|---|
| 6,747,632 B2 | 6/2004 | Howard |
| 7,123,351 B1 | 10/2006 | Schaefer |
| 7,159,469 B2 | 1/2007 | Claude et al. |
| 8,292,833 B2 | 10/2012 | Son et al. |
| 8,294,105 B2 | 10/2012 | Alameh et al. |
| 8,576,073 B2 | 11/2013 | Mooring et al. |
| 8,669,842 B2 | 3/2014 | Lim |
| 9,188,460 B2 | 11/2015 | Burton et al. |
| 9,348,462 B2 | 5/2016 | Wen |
| 9,442,488 B2 | 9/2016 | Shamlian et al. |
| 9,513,703 B2 | 12/2016 | Whitney et al. |
| 9,854,975 B2 | 1/2018 | Van Pieterson et al. |
| 10,429,851 B2 | 10/2019 | Shamlian et al. |
| 2002/0033803 A1* | 3/2002 | Holzrichter ............ G06F 3/0346 345/158 |
| 2002/0188210 A1 | 12/2002 | Aizawa |
| 2008/0256494 A1* | 10/2008 | Greenfield ............. G06V 40/28 715/863 |
| 2009/0174578 A1* | 7/2009 | Taki ....................... G01B 11/03 341/20 |
| 2009/0318908 A1* | 12/2009 | Van Pieterson ...... A61B 5/0059 606/9 |
| 2013/0033418 A1 | 2/2013 | Bevilacqua et al. |
| 2013/0307775 A1 | 11/2013 | Raynor |
| 2014/0135612 A1* | 5/2014 | Yuen ....................... A61B 5/112 600/407 |
| 2014/0257050 A1 | 9/2014 | Kuroda et al. |
| 2015/0051473 A1 | 2/2015 | Huang |
| 2015/0220109 A1* | 8/2015 | von Badinski ........ A61B 5/681 368/10 |
| 2016/0293143 A1 | 10/2016 | Kanemoto |
| 2016/0357265 A1 | 10/2016 | Maani |
| 2021/0157414 A1 | 5/2021 | Maani |

FOREIGN PATENT DOCUMENTS

| | | |
|---|---|---|
| CN | 102439538 | 5/2012 |
| CN | 102981608 | 3/2013 |
| CN | 103703495 | 8/2013 |
| CN | 203241934 | 10/2013 |
| CN | 103425244 | 12/2013 |
| CN | 103460221 | 12/2013 |
| CN | 103529936 | 1/2014 |
| JP | 2001133300 | 5/2001 |
| JP | 2005352739 | 12/2005 |
| JP | 2008027252 | 2/2008 |
| JP | 2008293501 | 12/2008 |
| JP | 2009539541 | 11/2009 |
| JP | 2011048818 | 3/2011 |
| JP | 2012181639 | 9/2012 |
| KR | 1020090034642 | 4/2009 |
| KR | 1020110022520 | 3/2011 |
| WO | WO 07/144817 | 12/2007 |
| WO | WO 09/044967 | 4/2009 |

\* cited by examiner

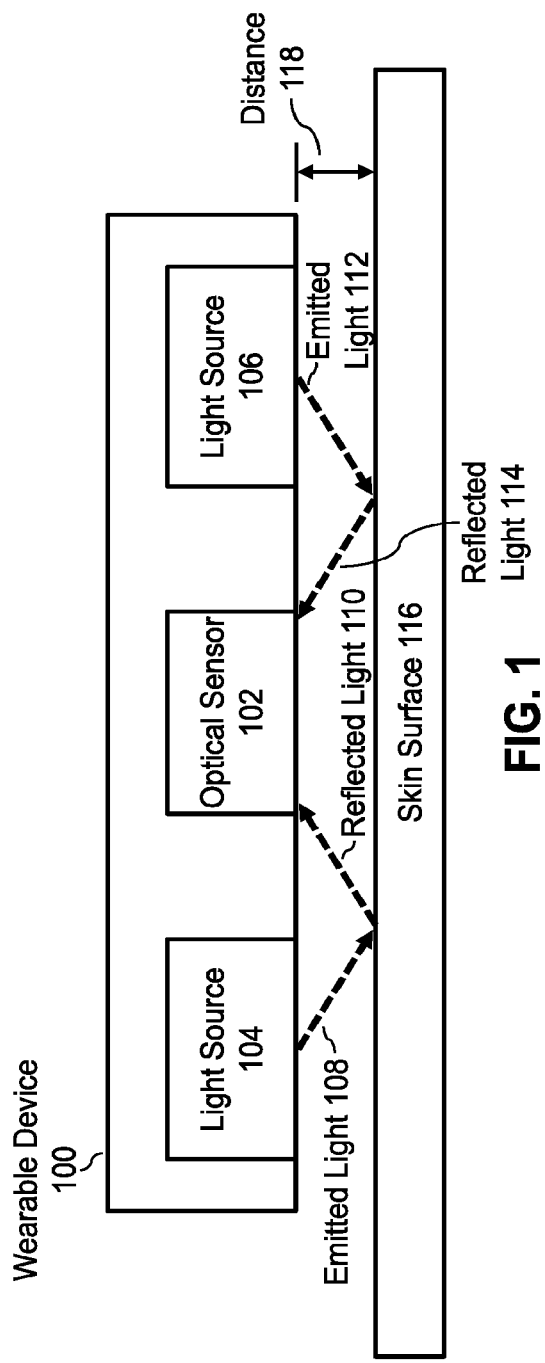
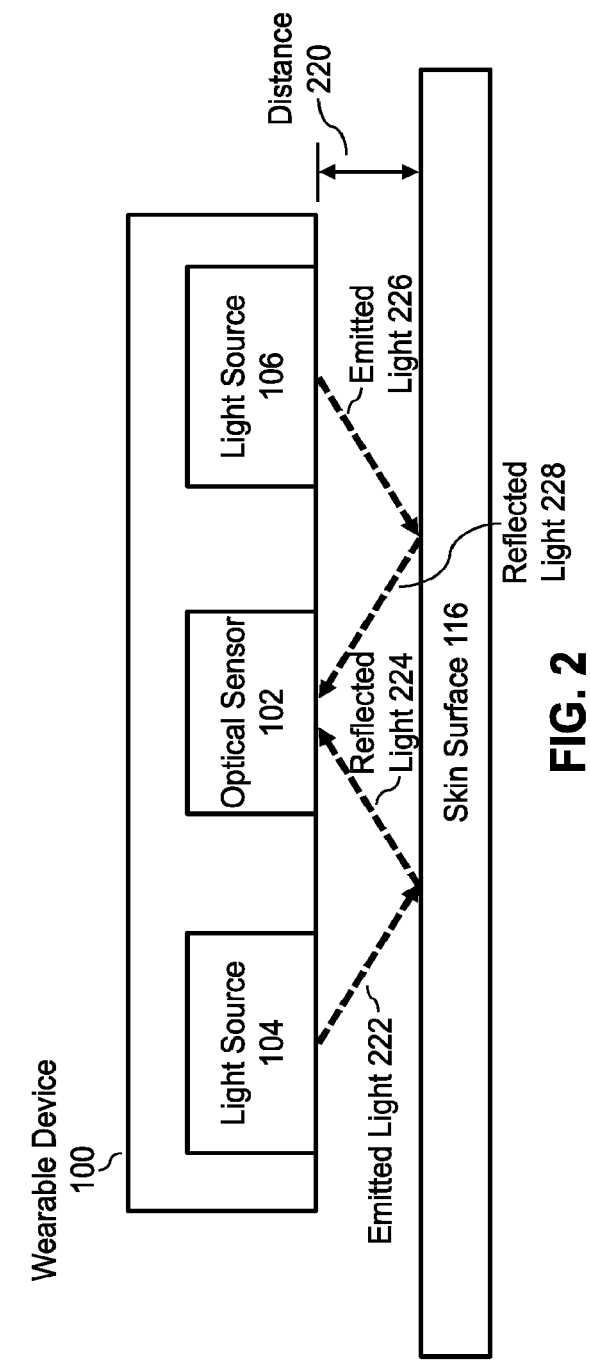

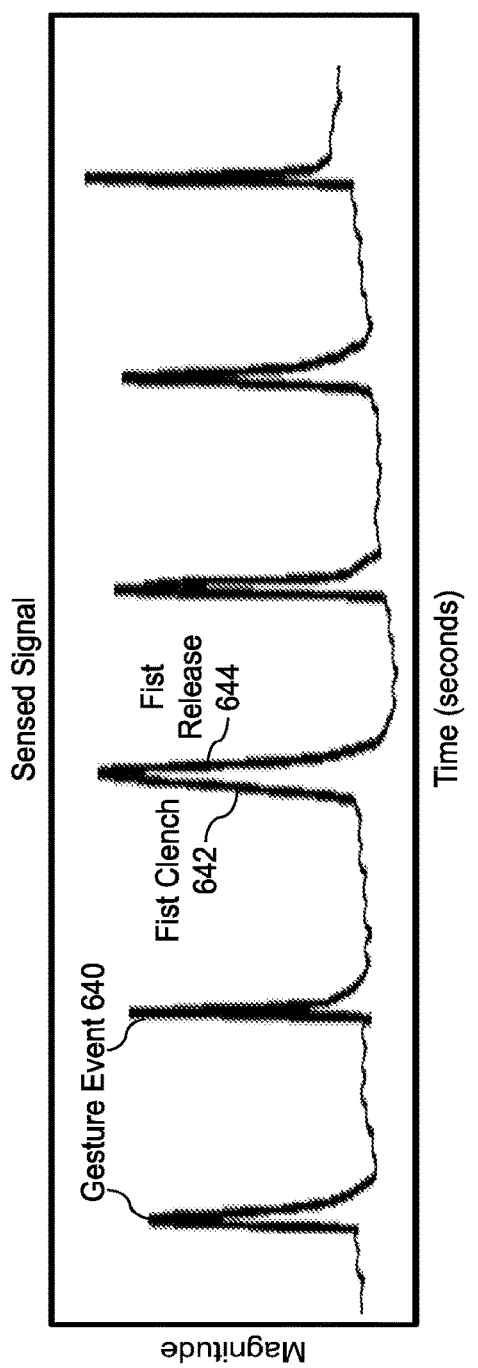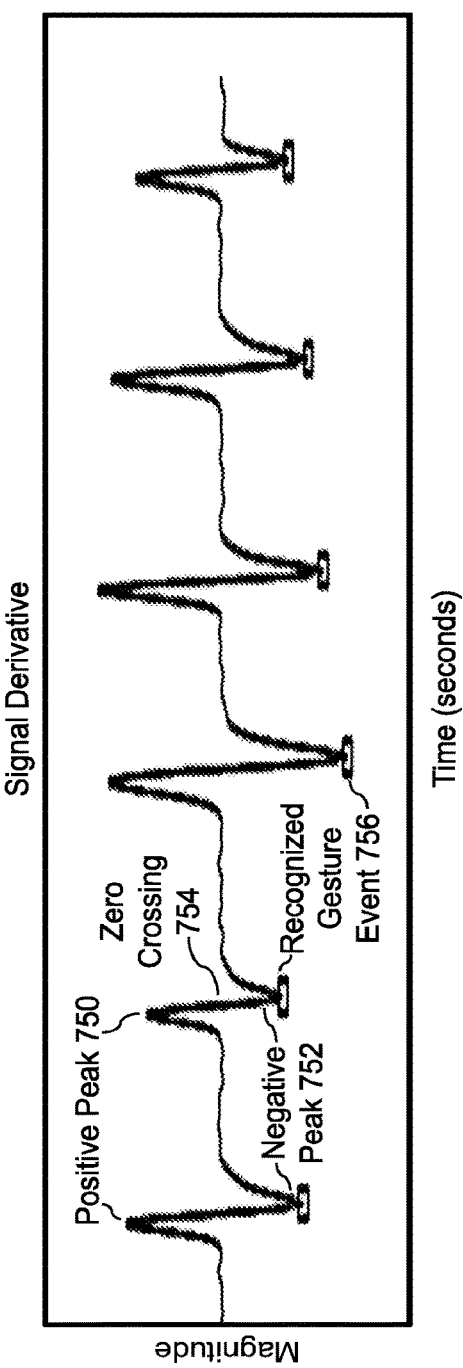

OPTICAL SENSING DEVICE

CROSS-REFERENCE TO RELATED APPLICATIONS

This application is a continuation of U.S. patent application Ser. No. 15/117,692, filed Aug. 9, 2016, entitled "Motion Gesture Input Detected Using Optical Sensors," which is a national stage application under 35 U.S.C. § 371 of International Patent Application No. PCT/US2014/015647, filed Feb. 10, 2014, entitled "Motion Gesture Input Detected Using Optical Sensors," the contents of which are incorporated herein by reference in their entirety.

FIELD

This relates generally to optical sensors and, more specifically, to using optical sensors in a wearable device to recognize gestures of the wearer.

BACKGROUND

Optical sensors have been incorporated into a variety of user devices to provide enhanced functionality and new opportunities for user interaction. Optical sensors for detecting light, detecting proximity, taking photographs, or the like have been incorporated into mobile phones (e.g., smartphones), tablet computers, wearable devices (e.g., watches, glasses, etc.), and other computing devices, allowing software developers to create engaging software applications ("apps") for entertainment, productivity, health, and the like. In some instances, optical sensors work in conjunction with a variety of other input mechanisms for interacting with a device (e.g., touchscreens, buttons, microphones for voice commands, etc.).

Many devices, however, can have limited device interaction and control capabilities due to device size constraints, display size constraints, operational constraints, and the like. For example, small or thin user devices can have a limited number of physical buttons for receiving user input. Similarly, small user devices can have touchscreens with limited space for providing virtual buttons or other virtual user interface elements. In addition, some devices can have buttons or other interactive elements that are cumbersome or uncomfortable to use in certain positions or in certain operating conditions. For example, it may be cumbersome to interact with a device using both hands (e.g., holding a device in one hand while engaging interface elements with the other). In another example, it may be difficult to press small buttons or engage touchscreen functions while a user's hands are otherwise occupied or unavailable (e.g., when wearing gloves, carrying groceries, holding a child's hand, driving, etc.). In still other examples, device interaction can be limited in a variety of other ways.

SUMMARY

Wearable user devices and methods for determining gestures are disclosed. An exemplary method for determining gestures can include causing light to be emitted from a wearable user device, sensing a portion of the light that is reflected by a wearer's skin, and determining a gesture made by the wearer based on changes in the sensed portion of the light. In one example, the changes in the sensed portion of the light correspond to a change in a distance between an optical sensor of the wearable user device and the wearer's skin, and sensing the portion of the light that is reflected by the wearer's skin comprises sensing the portion of the light using the optical sensor. In another example, the changes in the sensed portion of the light correspond to a change in an intensity of the sensed portion of the light reflected by the wearer's skin. In still another example, causing the light to be emitted from the wearable user device can include causing the light to be emitted from a first LED at a first wavelength and a second LED at a second wavelength that is different from the first wavelength. In yet another example, causing the light to be emitted from the wearable user device can include causing the light to be emitted at an angle relative to the wearable device, wherein the emitted light is incident on the wearer's skin at a non-perpendicular angle. In another example, sensing the portion of the light that is reflected by the wearer's skin can include generating a signal based on the sensed portion of the light using an optical sensor positioned between a first LED and a second LED, wherein causing the light to be emitted from the wearable user device can include causing the light to be emitted from the first LED and the second LED. In another example, determining the gesture based on changes in the sensed portion of the light can include identifying a positive peak, a negative peak, and a zero crossing in a derivative of a signal generated by an optical sensor used for sensing the portion of the light that is reflected by the wearer's skin. In still another example, the gesture comprises a first clench.

An exemplary non-transitory computer-readable storage medium can include computer-executable instructions for performing any of the exemplary methods discussed above. A database can be coupled to the non-transitory computer-readable storage medium, and the database can include gesture recognition data. An exemplary system can include the non-transitory computer-readable storage medium and a processor capable of executing the computer-executable instructions.

An exemplary wearable device for determining gestures can include a light source configured to emit light from the device toward a wearer's skin when the wearable device is worn, an optical sensor configured to generate a signal based on sensing a portion of the light reflected by the wearer's skin, a non-transitory computer-readable storage medium comprising computer-executable instructions for determining a gesture made by the wearer based on changes in the signal, and a processor coupled to receive the signal, wherein the processor is capable of executing the computer-executable instructions. In one example, the changes in the signal correspond to a change in a distance between the optical sensor and the wearer's skin. In another example, the signal generated by the optical sensor changes based on an intensity of the sensed portion of the light reflected by the wearer's skin. In still another example, the light source can include a first LED configured to emit light at a first wavelength and a second LED configured to emit light at a second wavelength that is different from the first wavelength. In yet another example, the light source can include a first LED and a second LED, and the optical sensor can be positioned between the first LED and the second LED. In another example, the light source is angled relative to the wearable device to direct light to be incident on the wearer's skin at a non-perpendicular angle. In another example, the computer-executable instructions for determining the gesture include computer-executable instructions for determining the gesture by identifying a positive peak, a negative peak, and a zero crossing in a derivative of the signal. In still another example, the gesture comprises a first clench. In yet another example, the optical sensor is configured to sense a wavelength of light that corresponds to a wavelength of light emitted by the light source.

An exemplary system for determining gestures can include a light source configured to emit light from a wearable user device toward a wearer's skin when the wearable user device is worn; an optical sensor configured to generate a signal based on sensing a portion of the light reflected by the wearer's skin; a non-transitory computer-readable storage medium including computer-executable instructions for determining a gesture made by the wearer based on changes in the signal; a processor coupled to receive the signal, wherein the processor is capable of executing the computer-executable instructions; and a communication module coupled to the processor, wherein the communication module is configured to communicate with a mobile device. In one example, the non-transitory computer-readable storage medium further includes instructions for communicating a command to the mobile device via the communication module in response to determining the gesture.

An exemplary computer-implemented method for indirectly determining a hand gesture using a wearable device worn on a wearer's wrist can include causing light to be emitted toward the wearer's wrist from a light source of the wearable device, wherein the light source is positioned proximate to skin at the wearer's wrist; sensing a portion of the light that is reflected by the skin at the wearer's wrist using an optical sensor of the wearable device, wherein the optical sensor is positioned proximate to the skin at the wearer's wrist; indirectly determining a hand gesture made by the wearer based on a change in the sensed portion of the light that is reflected by the skin at the wearer's wrist, wherein the change results from a distance between the optical sensor and the skin at the wearer's wrist increasing or decreasing due to the hand gesture. In one example, the distance between the optical sensor and the skin at the wearer's wrist increases or decreases less than $\frac{1}{8}$th of an inch due to the hand gesture. In another example, the change in the sensed portion of the light can correspond to an intensity of the sensed portion of the light increasing or decreasing based on the increasing or decreasing distance between the optical sensor and the skin at the wearer's wrist. In still another example, indirectly determining the hand gesture made by the wearer includes sensing the change in the sensed portion of the light that is reflected by the skin at the wearer's wrist without directly sensing hand movement of the wearer.

BRIEF DESCRIPTION OF THE DRAWINGS

FIG. 1 illustrates an exemplary wearable device near a user's skin.

FIG. 2 illustrates an exemplary wearable device separated a distance from a user's skin.

FIG. 6 illustrates an exemplary waveform of a sensed signal from an optical sensor of a wearable device.

FIG. 7 illustrates an exemplary derivative waveform of a sensed signal from an optical sensor of a wearable device.

DETAILED DESCRIPTION

Figure 3B:
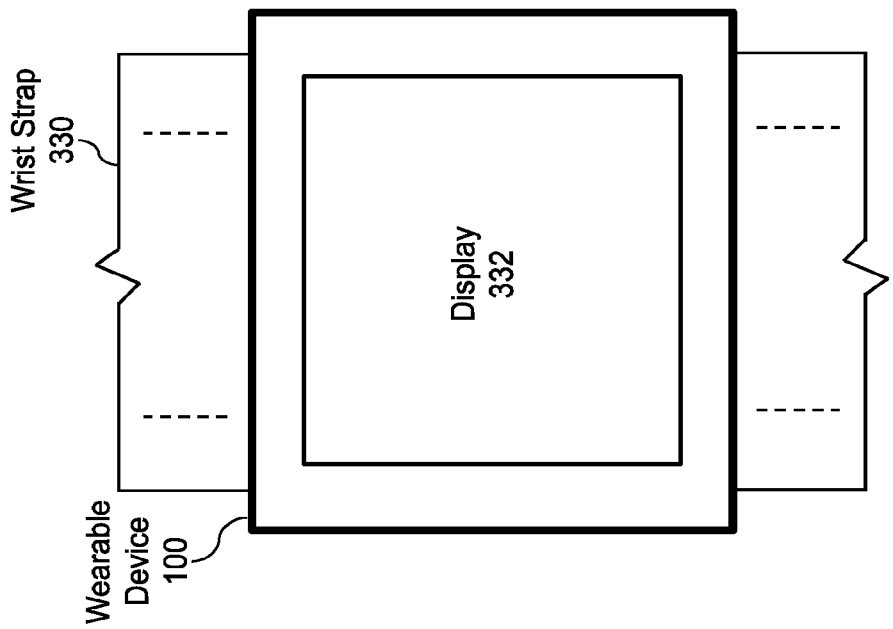
FIG. 3B illustrates the face or front side of an exemplary wearable device.

In the following description of examples, reference is made to the accompanying drawings in which it is shown by way of illustration specific examples that can be practiced. It is to be understood that other examples can be used and structural changes can be made without departing from the scope of the various examples.

This relates to a wearable device with an optical sensor that can be used to recognize gestures of a user wearing the device. In one example, one or more light sources can be positioned on the back or skin-facing side of a wearable device, such as a watch, wristband, armband, leg-band, chest-band, headband, or the like. An optical sensor can be positioned near the one or more light sources on the same side of the wearable device. During operation, light can be emitted from the one or more light sources and sensed using the optical sensor. Changes in the sensed light caused by movements of the user wearing the device can be used to recognize user gestures. For example, light emitted from a light source can reflect off a wearer's skin, and the reflected light can be sensed using the optical sensor. When the wearer gestures in some way, such as by clenching the first on the arm where the device is worn, the reflected light can change perceptibly due to muscle contraction, the device shifting on the wrist, skin stretching, the distance changing between the optical sensor and the wearer's skin, or the like. Various changing features of the reflected and sensed light can be used to recognize a deliberate gesture, such as changes in angle of incidence, intensity, position, wavelength, or the like.

In some examples, incorporating an optical sensor in a wearable device and using it to recognize wearer gestures can provide a convenient way to interact with the wearable device. Such gesture recognition can supplement or even replace other interfaces, such as touchscreens, buttons, dials, or the like, and it can be used to perform the same or similar functions, such as selecting a display element, navigating to a different view, changing the time, changing a display, answering a phone call, or any of a variety of other functions. In some examples, such gesture recognition can provide one-handed or hands-free device operation, which can provide convenience as well as safety (e.g., when carrying groceries, driving, or the like). It should be understood that many other applications are possible, and gesture recognition as discussed herein can provide a variety of other benefits and enhance a user's experience in many other ways.

FIG. 1 illustrates exemplary wearable device 100 near a wearer's skin surface 116. In one example, wearable device 100 can be configured to be worn on a user's wrist (e.g., as a bracelet, wristwatch, wristband, etc.), and skin surface 116 could be anywhere around the user's wrist depending on how the user prefers to wear the device (e.g., with an associated display near the palm or near the back side of the hand). Wearable device 100 can include, among other things, light source 104, light source 106, and optical sensor 102.

Light sources 104 and 106 can each include a light-emitting diode (LED) or another light source. In some examples, the light sources can be angled such that the bulk of the emitted light reflects back toward optical sensor 102 when the device is worn normally (e.g., angled such that emitted light can be incident on the wearer's skin at a non-perpendicular angle). Angling the light sources can also avoid arcing between the light source and the sensor (e.g., emitted light reaching the sensor without first reflecting off a user's skin). For example, light source 104 can be angled sixty degrees away from vertical toward optical sensor 102, such that the bulk of emitted light 108 can reflect off skin surface 116 toward optical sensor 102, as illustrated by reflected light 110. Similarly, light source 106 can be angled sixty degrees away from vertical toward optical sensor 102, such that the bulk of emitted light 112 can reflect off skin surface 116 toward optical sensor 102, as illustrated by reflected light 114. In other examples, light sources 104 and 106 can be angled more sharply vertical (e.g., thirty degrees from vertical toward optical sensor 102) or more sharply horizontal.

Light sources 104 and 106 can be configured in a variety of different ways for robust recognition of changes in reflected light 110 and reflected light 114. In one example, light sources 104 and 106 can include LED's that emit infrared light in the 900 nm range. In other examples, light source 104 can be configured to emit light having a different wavelength than that of the light emitted by light source 106. In these examples, the light emitted by light source 104 and the light emitted by light source 106 can be selected such that they can be differentiated by optical sensor 102, and can be visible, ultraviolet, infrared, or other wavelengths. Light sources 104 and 106 can also be operated differently to allow for distinct reflected light recognition, such as by pulsing emitted light at different frequencies, emitting light at alternating intervals, or the like. In some examples, having two separate light sources can aid in distinguishing between localized movements or whole device movements (e.g., certain muscles contracting versus an entire device shifting uniformly). In still other examples, however, wearable device 100 can include a single light source (e.g., either light source 104 or light source 106), more than two light sources, more than one optical sensor, or various other combinations, or can include an optical sensor that can detect changes in ambient lighting reflected by skin surface 116 without a dedicated light source.

Optical sensor 102 can include a photodiode or other photodetector capable of converting light into a current, voltage, or other signal. In one example, optical sensor 102 can convert sensed light into a signal (e.g., current, voltage, etc.) with a magnitude or value that corresponds to the amount of light received by the sensor. In some examples, optical sensor 102 can be configured to sense particular wavelengths of light (e.g., those generated by light sources 104 and 106) while not sensing others. As illustrated in FIG. 1, distance 118 between skin surface 116 and wearable device 100 can dictate where reflected light 110 and reflected light 114 are incident on the skin-facing side of wearable device 100. While emitted light and reflected light are illustrated in FIG. 1 as straight lines for simplicity, it should be understood that light can spread into a larger beam and reflect at different angles. In the example of FIG. 1, with distance 118 separating wearable device 100 and skin surface 116, reflected light 110 and reflected light 114 are shown striking the edges of optical sensor 102 (e.g., the bulk of the light represented by straight lines striking the edges). In one example, optical sensor 102 might generate a signal representative of a relatively small amount of sensed light as much of reflected light 110 and reflected light 114 might strike the body of wearable device 100 rather than the sensor.

In contrast, FIG. 2 illustrates wearable device 100 separated from skin surface 116 by distance 220, which might be larger than distance 118 of FIG. 1. Light sources 104 and 106 can generate emitted light 222 and emitted light 226, which can be reflected off skin surface 116 as reflected light 224 and reflected light 228, respectively. Distance 220 can allow reflected light 224 and reflected light 228 to strike optical sensor 102 near the center of the sensor (as opposed to striking the edges of the sensor, as in FIG. 1). It should be understood that the simplified straight light lines in FIG. 2 are illustrated for simplicity, and the light can spread into a larger beam and reflect at different angles. As such, the more centered light incidence illustrated in FIG. 2 can signify that more of the spread of light can be received by the sensor than if the spread of light was incident elsewhere. With more of the spread of light incident near the center, optical sensor 102 might generate a signal representative of a relatively large amount of sensed light as the bulk of reflected light 224 and reflected light 228 might strike the sensor itself rather than other components (e.g., being incident on the sensor rather than the body of wearable device 100). Optical sensor 102 can thus generate distinct signals that can be representative of the distance between wearable device 100 and skin surface 116.

In some examples, a user's hand gesture can account for the difference between distance 118 in FIG. 1 and distance 220 in FIG. 2. As discussed in more detail below with reference to FIGS. 4-8, a user can gesture by clenching a fist, moving a finger, bending a wrist, or the like, which can cause the distance between wearable device 100 and skin surface 116 to change (e.g., change from distance 118 in FIG. 1 to distance 220 in FIG. 2). In some examples, a user's gesture can cause at least a slight shift in a wrist strap associated with a wearable device or a deformation in a user's skin, which can cause a change in distance between the device and the user's skin. Similarly, in some instances, contracting muscles can cause the wrist to expand, which can also change the distance between a wearable device and a user's skin. It should be understood that many other factors associated with a gesture can cause a change in the distance between a wearable device and a user's skin. The different signals generated by optical sensor 102 based on different distances can be used to recognize when a user gestures deliberately to interact with a wearable device.

In other examples, factors besides the distance between a wearable device and a skin surface can be used to recognize a gesture. For example, skin stretching, user perspiration, and the like can cause perceptible changes in reflected light that optical sensor 102 can detect. In some examples, light sources 104 and 106 can generate light that can at least partially penetrate the outer skin layer and reflect in different ways based on muscles contracting, tendons shifting, tissue compressing, skin stretching, density changing, pressure changing, or the like. In any of the various examples, optical sensor 102 can sense the reflected light and generate signals based on how emitted light is modified before being incident on the sensor. Changes in the signals generated by optical sensor 102 can be used to recognize wearer activity.

It should be understood that gesture recognition as discussed herein can be used to determine hand gestures indirectly by sensing small changes that occur at a wearer's wrist as opposed to directly sensing movements of a gesturing hand. For example, while a deliberate gesture might include clenching and unclenching a fist, an increasing or decreasing distance (e.g., changing less than ⅛th of an inch) between an optical sensor of a wearable device and the skin at the wearer's wrist can be sensed and used to indirectly recognize the gesture rather than directly detecting the motion of the clenching and unclenching first (e.g., finger and palm movements). Light can be emitted toward the skin at a wearer's wrist, reflect off the skin at the wearer's wrist, and be sensed by an optical sensor positioned proximate to the skin at the wearer's wrist. The intensity of the sensed light can increase or decrease based on an increasing or decreasing distance between the optical sensor and the skin at the wearer's wrist, which changing distance can result from a deliberate hand gesture as discussed above. Accordingly, by monitoring small changes in light emitted and sensed at the wearer's wrist, a hand gesture can be indirectly recognized without directly sensing finger or palm movements.

It should further be understood that gesture recognition discussed herein can be applied to a variety of other body parts beyond the wrist and beyond wearable devices that are worn on the wrist, and wrist-worn devices discussed herein are provided as non-limiting examples of gesture recognition using optical sensors. For example, gesture recognition according to the examples herein can be performed using a device on an armband, leg-band, chest-band, headband, or the like. Device and skin movements can be detected, and those detected movements can be used to determine a gesture. For example, a wearable device in a headband can recognize a deliberate gesture from a user raising one or both eyebrows, causing the headband device to shift and/or perceptibly altering the skin on the forehead. Similarly, a wearable device in a leg-band or ankle-band can recognize a deliberate gesture from a user bending a leg, moving a foot, or the like, causing the leg-band or ankle-band device to shift and/or perceptibly altering the skin on the leg, ankle, or foot. As with the examples discussed herein, any movements that cause device shifting, distance changes, skin movements, or the like can be detected and used for determining a gesture. Accordingly, the various examples discussed herein can be applied to a variety of devices that can be worn near any part of the skin anywhere on the body, and gestures can be determined from changes in optical sensor signals of those various devices.

It should further be understood that the proportions, spacing, or layout of light sources, optical sensors, and wearable devices that can be used to recognize gestures as discussed herein can vary from those examples illustrated in FIG. 1 and FIG. 2. For example, light sources and optical sensors can be a fraction of the illustrated size, and light sources and optical sensors can be positioned adjacent one another in a much smaller space. Moreover, distances 118 and 220 may be exaggerated, and in some instances, optical sensor 102 can detect differences in distances that may be imperceptible to the human eye. For example, although a change in distance between a wearable device and a user's skin may not be apparent to the wearer when gesturing, optical sensor 102 can be sensitive enough to recognize a slight difference in distance (e.g., based on a slight change in wrist circumference during a gesture).

It should further be understood that wearable device 100 can include a variety of other components not illustrated or described here, such as a display, touchscreen, buttons, dials, central processing unit, memory, camera, indicator lights, oscillator, clock, wireless transceivers, batteries, motions sensors, light sensors, touch sensors, other sensors, or the like. It should also be understood that gesture recognition using an optical sensor, as discussed herein, can be implemented in a variety of different wearable devices with a variety of different functions.

Figure 3A:
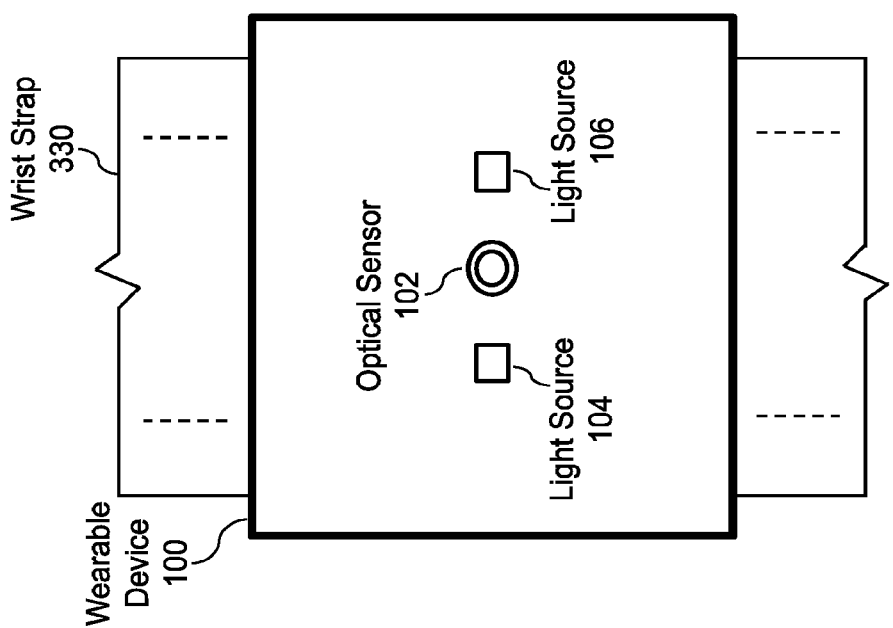
FIG. 3A illustrates the skin-facing or back side of an exemplary wearable device.

FIG. 3A illustrates the skin-facing or back side of exemplary wearable device 100. In one example, wearable device 100 includes a wristwatch or other wearable device, which can be attached to wrist strap 330 for securing the device to a user's wrist. As illustrated, the skin-facing or back side of wearable device 100 can include light sources 104 and 106 separated by optical sensor 102. Light sources 104 and 106 can include LED's, which can be positioned behind glass, plastic, or other transparent windows, or can be positioned behind the same window. In some examples, optical sensor 102 can also be positioned behind the same or a different glass, plastic, or other transparent window. Optical sensor 102, and particularly a sensing or detecting area of optical sensor 102, can be sized to avoid interference from arm hair and other skin surface variations. For example, optical sensor 102 can be sized several times larger than a typical arm hair such that the sensor might not be easily blocked from sensing reflected light.

It should be understood that the proportions, spacing, or layout of light sources and optical sensors that can be used to recognize gestures can vary from the example illustrated in FIG. 3A. For example, light sources 104 and 106 and optical sensor 102 can be positioned within wrist strap 330, and wrist strap 330 can include wiring to source power from and enable communication with wearable device 100. In other examples, light sources 104 and 106 and optical sensor 102 can be oriented differently (e.g., in-line with wrist strap 330).

FIG. 3B illustrates the face or front side of exemplary wearable device 100 secured to wrist strap 330. In one example, wearable device 100 can include a display 332 on the front side, and a user can interact with information shown on display 332 using gestures. For example, images, data, virtual buttons, a clock, applications, music tracks, or the like can be displayed on display 332, and a user can perform certain gestures to make selections, advance to a new display, enable the display, return to a home screen, navigate forward, navigate backward, open a notification, scroll through information, scroll through applications, scroll through songs, pause playing music, start playing an audio file, answer a phone call, engage a virtual assistant, or perform any of a variety of other functions. Various gestures can be used to engage these functions, as discussed in more detail below with reference to FIG. 4 and FIG. 5.

In some examples, display 332 can include touchscreen capability that can be used in addition to or instead of gestures to interact with wearable device 100. Similarly, wearable device 100 can include a variety of other components not illustrated in FIG. 3A or FIG. 3B or described here, such as buttons, dials, central processing unit, memory, camera, indicator lights, oscillator, clock, wireless transceivers, batteries, motions sensors, light sensors, touch sensors, other sensors, or the like.

Figure 4:
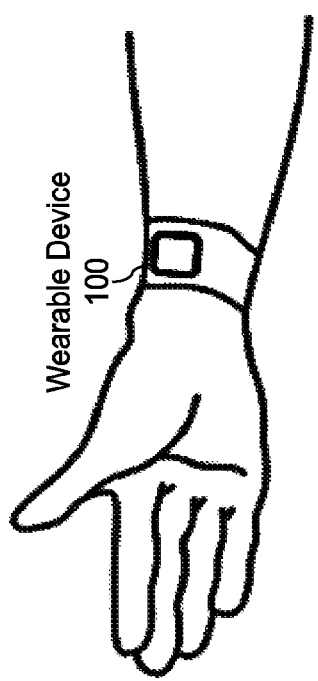
FIG. 4 illustrates an open hand of a user wearing an exemplary wearable device.

FIG. 4 illustrates an open hand of a user wearing exemplary wearable device 100.

As mentioned above, a user can interact with wearable device 100 using a variety of gestures that can cause perceptible changes in light directed to a user's skin, reflected off the user's skin, and sensed by an optical sensor. A wide variety of movements can cause changes to reflected light that can alter the signal generated by an optical sensor, and such an altered signal can be interpreted as a deliberate gesture. Movements that can be interpreted as a deliberate gesture can include finger movements, hand movements, wrist movements, whole arm movements, or the like. For example, the open hand in FIG. 4 can be clenched into a first as shown in FIG. 5 and opened or unclenched back to the position shown in FIG. 4 as a deliberate gesture for interacting with wearable device 100.

Figure 5:
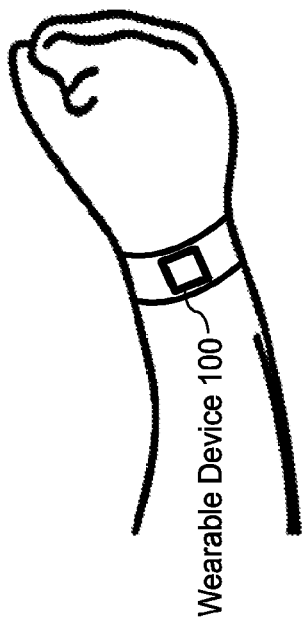
FIG. 5 illustrates a clenched first of a user wearing an exemplary wearable device.

Notably, the wearer's wrist in FIG. 5 can be at least slightly altered as compared to the wearer's wrist in FIG. 4 (e.g., circumference expanded, skin stretched, muscles contracted, tendons shifted, tissue compressed, etc.). The at least slight alteration of the wrist from having an open hand as in FIG. 4 to having a clenched first as in FIG. 5 can cause the distance between wearable device 100 and the wearer's skin to change (e.g., increase or decrease). As discussed above, an optical sensor associated with wearable device 100 can generate a signal that changes when the distance between the device and the wearer's skin changes, such that the motion of clenching the user's first can be perceived along with the subsequent motion of unclenching the user's fist. In some examples, the sequential clenching and unclenching of the user's first can be recognized as a deliberate gesture (e.g., like the equivalent of a mouse cursor click or touchscreen press to select a virtual button, answer a phone call, navigate forward, etc.).

In other examples, other motions can be used as gestures for interacting with wearable device 100. For example, the wearer can move the thumb inward to touch the palm and subsequently release the thumb back to its natural position (e.g., the position shown in FIG. 4). In another example, the wearer can contract the fingers (e.g., digits other than the thumb) to touch the palm and subsequently release them hack to their natural position. In yet another example, the wearer can contract an individual finger (e.g., the index finger, middle finger, etc.) to touch the palm and subsequently release the finger to its natural position. In still other examples, the wearer can bend the hand downward at the wrist (e.g., flexion), bend the hand upward at the wrist (e.g., extension), twist the hand (e.g., pronation or supination), angle the hand to the left or right (e.g., radial deviation or ulnar deviation), or perform any of a variety of other deliberate motions that can cause at least slight alterations at the wrist that can be perceived by an optical sensor sensing changes in incident light.

In some examples, wearable device 100 can be configured to uniquely recognize different gestures for performing different functions as well as recognize different ways of performing the same gestures as indicating different user intent. For example, a wearer can clench the fist, hold the clenched first for a certain amount of time, and subsequently open the hand to request a function different than one associated with clenching and unclenching the first in rapid succession (e.g., as in the difference between a simple mouse cursor click and a double-click). In another example, a wearer can twist the hand in one direction to request one function (e.g., navigate forward) and twist the hand in the other direction to request a different function (e.g., navigate backward). In yet another example, a wearer can touch the thumb to the palm to request one function (e.g., select) and touch the fingers to the palm to request a different function (e.g., return to a home screen). It should be understood that a variety of different motions can be perceived and associated with a variety of different functions. In other examples, however, any of a group of different motions can each be perceived as a user request for the same function (e.g., any of first clenching, wrist bending, or thumb touching can be interpreted as a request for the same function).

As wrist shape, size, musculature, and other characteristics vary for different users, wearable device 100 can be configured in some examples to perform learning or training to adapt to a particular wearer. For example, an application associated with wearable device 100 can instruct the wearer to perform certain movements (e.g., instruct to clench and unclench the first by displaying the command on the device display, playing the command audibly, or the like). As the wearer performs the movements, wearable device 100 can monitor how signals generated by the optical sensor change in response to the requested movements. Wearable device 100 can then associate changes in the optical sensor signals with particular movements in order to recognize a deliberate gesture of the specific wearer in the future. In some instances, wearable device 100 can be trained differently for wearing on different hands or for wearing in different positions on the wrist (e.g., palm side or back side). In some examples, particular changes in the optical sensor signal and associated gestures can be stored in a database (e.g., in memory on the device, remote from the device, on another device, etc.), and sensed changes in the optical sensor signal can be compared to the stored data to recognize a particular gesture.

FIG. 6 illustrates an exemplary waveform of a sensed signal from an optical sensor of a wearable device (e.g., such as from optical sensor 102 of wearable device 100 discussed above). In one example, the vertical axis can correspond to a magnitude of a signal generated by an optical sensor over time (e.g., in seconds on the horizontal axis). Such a signal can correspond to a current, voltage, or similar signal representative of sensed light. For example, the signal can be a current with units of milliamps, which can be quantized along a scale to enable comparison, calculation, and gesture recognition (e.g., can be digitized with 24 bits of precision).

The waveform in FIG. 6 can correspond to a user wearing a wearable device with an optical sensor as discussed herein performing six repeated gestures, each gesture being separated by a gap of a few seconds. For example, each spike or gesture event 640 can correspond to the clenching and unclenching of the wearer's first in rapid succession. As indicated, first clench 642 can correspond to an increasing magnitude, and subsequent first release 644 can correspond to a decreasing magnitude. In some examples, the combination of an increasing magnitude and a decreasing magnitude in rapid succession can be recognized as a deliberate gesture.

In the example illustrated in FIG. 6, the wearable device may have shifted relative to the corresponding wearer such that more light was sensed when the first was clenched than when the first was unclenched. As such, the waveform can be seen rising in magnitude with first clench 642 and subsequently falling in magnitude with first release 644. In other examples, however, the signal and the associated waveform can vary for different wearers or for the same wearer performing a different gesture. For example, the magnitude may first fall and then rise in succession for a different user or for a different gesture (e.g., bending the wrist). In another example, the peak magnitude of the spike associated with gesture event 640 can be lower or higher for different users or different gestures. Similarly, the width or the slope of a spike associated with a gesture event can vary for different users or different gestures (e.g., wider when holding the first clenched to indicate a particular user request). It should be understood that various different gestures and wearer characteristics can produce a variety of different waveforms that can be used to recognize gesture events (e.g., deliberate user gestures indicating particular user intent). Moreover, it should be understood that in some examples a wearable device can learn or be trained to associate unique signals with a particular wearer's gestures.

In some examples, given how an optical sensor signal can vary for different users and different gestures, a derivative of the optical sensor signal can be used to achieve robust gesture recognition (e.g., while ignoring noise, casual movements, stray light pollution, etc.). FIG. 7 illustrates an exemplary derivative waveform of a sensed signal from an optical sensor of a wearable device. In one example, the derivative waveform of FIG. 7 can correspond to the raw signal waveform of FIG. 6. In some examples, positives peaks 750, negative peaks 752, and zero crossings 754 can be used to positively identify a deliberate user gesture for interacting with a wearable device. For example, having an occurrence of positive peak 750, followed by zero crossing 754, followed by negative peak 752 can be sufficient to identify recognized gesture event 756 (marked by rectangles). In another example, order can vary such that a negative peak can be followed by a zero crossing and a positive peak and also be identified as a recognized gesture event. In yet another example, having an occurrence of a positive peak, a negative peak, and a zero crossing within a certain time window can be sufficient to recognize a gesture.

Figure 8:
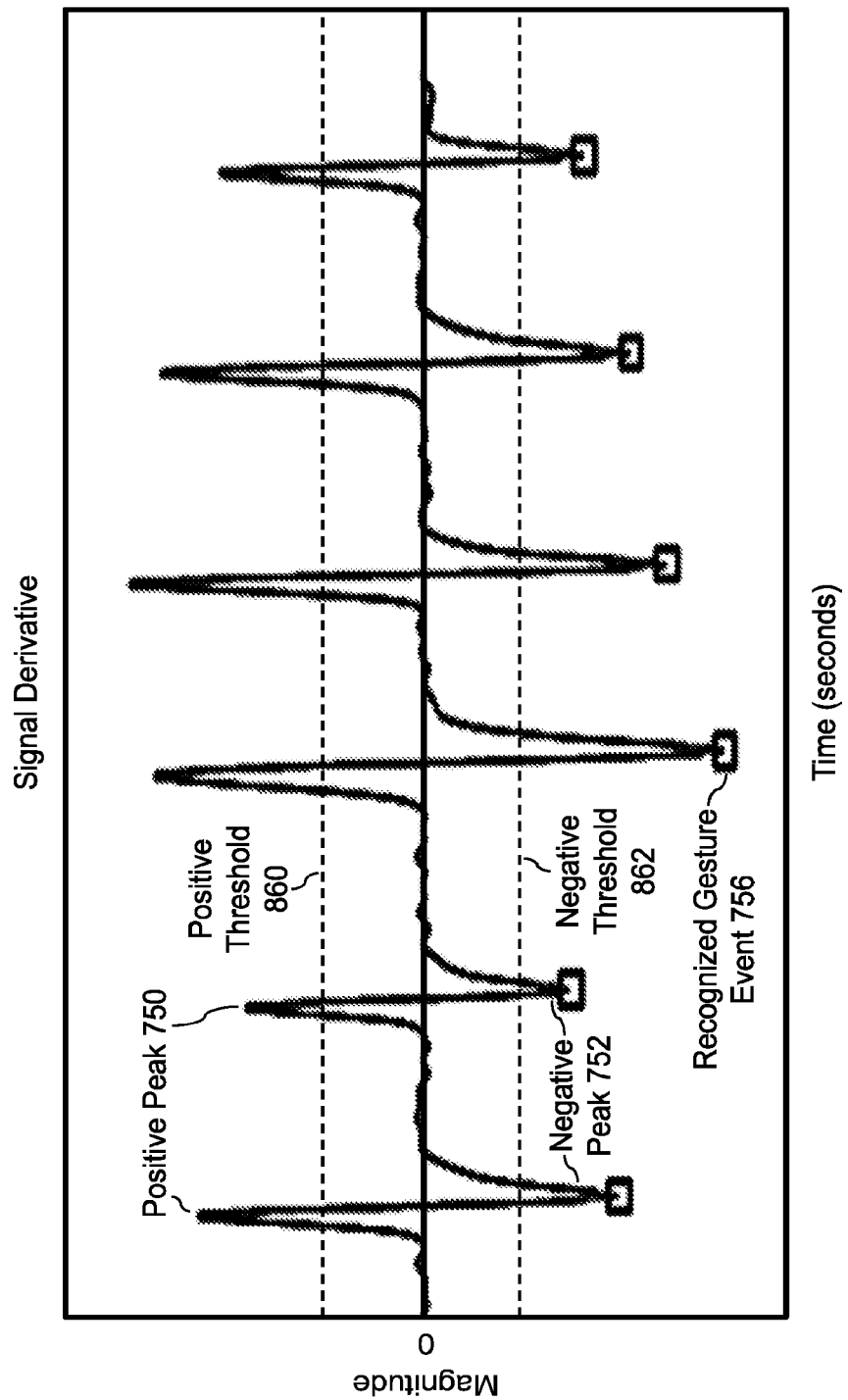
FIG. 8 illustrates an exemplary derivative waveform with gesture recognition thresholds.

In some examples, gesture recognition thresholds can be used to filter out noise or other haphazard data and correctly recognize deliberate user gestures for interacting with a wearable device. FIG. 8 illustrates an exemplary derivative waveform with gesture recognition thresholds, including positive threshold 860 and negative threshold 862. In one example, for purposes of recognizing a deliberate gesture, a positive or negative peak in a derivative waveform can be recognize when outside predetermined thresholds, such as being outside positive threshold 860 and negative threshold 862. In some examples, peaks or other data movements within the thresholds can be ignored. For example, minor vibrations or casual hand motions can lead to significant movements in a raw optical sensor signal as well as in the derivative of the raw optical sensor signal. To avoid errantly recognizing gestures (e.g., false positives) from such movements, gesture recognition thresholds can be used to restrict positive gesture recognition to instances of significant movement outside the thresholds.

In other examples, a variety of other techniques and data can be used to positively recognize deliberate user gestures while filtering out noise and other haphazard data. For example, concavity changes, zero crossings, time between peaks, peak slope, peak width, and other data characteristics can be used to limit gesture recognition to particular expected signal behavior. In this manner, a wearable device can accurately recognize and respond to user gestures when appropriate, and avoid recognizing user interaction when none was intended.

Figure 9:
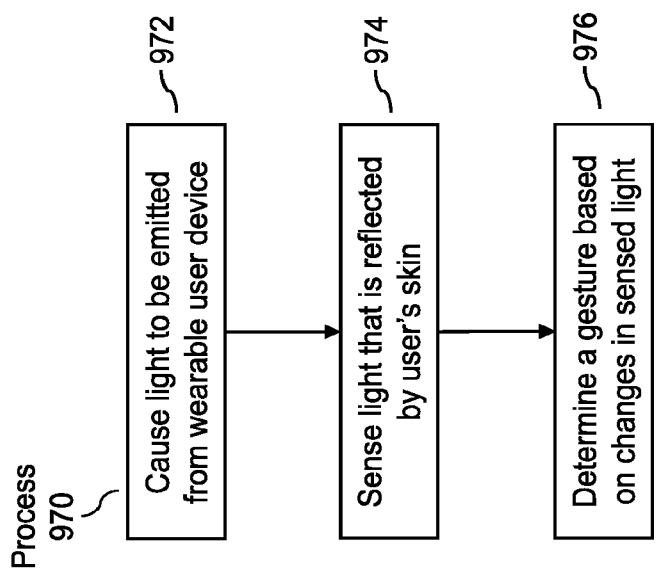
FIG. 9 illustrates an exemplary process for determining gestures using an optical sensor of a wearable device.

FIG. 9 illustrates exemplary process 970, which can be used according to various examples discussed herein for determining gestures using an optical sensor in a wearable device. At block 972, light can be caused to be emitted from a wearable user device. For example, light can be emitted as discussed above with reference to light source 104 and/or light source 106 of wearable device 100 in FIG. 1. A light source can include a light-emitting diode (LED) that can be angled such that the bulk of the emitted light reflects back toward an optical sensor (e.g., optical sensor 102) when the device is worn normally (e.g., angled such that emitted light can be incident on the wearer's skin at a non-perpendicular angle). In some examples, two light sources can be used, and each light source can be configured to emit light having a different wavelength than that of the other light source. In such examples, the light emitted by individual light sources can be selected such that they can be differentiated by an optical sensor, and can be visible, ultraviolet, infrared, or other wavelengths. Light sources can also be operated differently to allow for distinct reflected light recognition, such as by pulsing emitted light at different frequencies, emitting light at alternating intervals, or the like. In some examples, having two separate light sources can aid in distinguishing between localized movements or whole device movements (e.g., certain muscles contracting versus an entire device shifting uniformly). In still other examples, however, a wearable device can include a single light source, more than two light sources, more than one optical sensor, or various other combinations, or can include an optical sensor that can detect changes in ambient lighting reflected by a skin surface without a dedicated light source.

Referring again to FIG. 9, at block 974, light can be sensed that is reflected by a user's skin. For example, reflected light can be sensed as discussed above with reference to optical sensor 102. Light can be sensed in a variety of ways, such as being sensed with a photodiode that generates a current, voltage, or other signal representing the relative amount of light incident on the sensor (e.g., the intensity of received light). In some examples, an optical sensor can be configured to sense primarily or exclusively light with similar characteristics (e.g., wavelength) as light emitted from light sources associated with a wearable device. In one example, the distance between a skin surface of a user and a wearable device can dictate where reflected light is incident on the skin-facing side of the wearable device, which can affect the intensity of light received at the sensor. For example, in a first position relative to a wearer's skin, an optical sensor might generate a signal representative of a relatively small amount of sensed light, while in another position relative to a wearer's skin, the optical sensor might generate a signal representative of a relatively large amount of sensed light given a shift in where the light is incident relative to the sensor. Movements of the wearable device and the optical sensor relative to a wearer's skin can thus cause the signal generated by the optical sensor to change as the intensity of light received at the sensor changes.

Referring again to FIG. 9, at block 976, a gesture can be determined based on changes in sensed light. For example, a gesture event can be determined from a raw optical sensor signal (e.g., as discussed with reference to FIG. 6), or from the derivative of an optical sensor signal (e.g., as discussed with reference to FIG. 7 or FIG. 8). A wide variety of movements can cause changes to reflected light that can alter the signal generated by an optical sensor, and such an altered signal can be interpreted as a deliberate gesture. Movements that can be interpreted as a deliberate gesture can include finger movements, hand movements, wrist movements, whole arm movements, or the like. For example, with a wristwatch-type wearable device, the wearer's wrist can be at least slightly altered between a clenched first and an open hand (e.g., circumference expanded, skin stretched, muscles contracted, tendons shifted, tissue compressed, etc.). The at least slight alteration of the wrist from having an open hand to having a clenched first can cause the distance between the wearable device and the wearer's skin to change (e.g., increase or decrease). As discussed above, an optical sensor associated with the wearable device can generate a signal that changes when the distance between the device and the wearer's skin changes, such that the motion of clenching the user's first can be perceived along with the subsequent motion of unclenching the user's fist. In some examples, the sequential clenching and unclenching of the user's first can be determined to be a deliberate gesture (e.g., like the equivalent of a mouse cursor click or touchscreen press to select a virtual button, answer a phone call, navigate forward, etc.).

In some examples, a derivative of the optical sensor signal can be used for gesture recognition. For example, having an occurrence of a positive peak, followed by a zero crossing, followed by a negative peak in the derivative of the optical sensor signal can be sufficient to determine a deliberate gesture. In another example, order can vary such that a negative peak can be followed by a zero crossing and a positive peak and also be identified as a deliberate gesture. In yet another example, having an occurrence of a positive peak, a negative peak, and a zero crossing within a certain time window can be sufficient to determine a deliberate gesture in a derivative of an optical sensor signal.

In other examples, a variety of other techniques and data can be used to positively determine deliberate user gestures while filtering out noise and other haphazard data. For example, concavity changes, zero crossings, time between peaks, peak slope, peak width, and other data characteristics can be used to limit gesture recognition to particular expected signal behavior. In this manner, a wearable device can accurately determine and respond to user gestures when appropriate, and avoid recognizing user interaction when none was intended.

In some examples, a determined gesture can be associated with a particular user request, and a wearable device can respond appropriately to the user request (e.g., a request to select a virtual button, navigate to a different view, answer a phone call, advance to a different song, or the like). Gesture recognition can thus be used in some examples to enable a user to interact with a wearable device without pushing buttons, touching a touchscreen, or the like.

Figure 10:
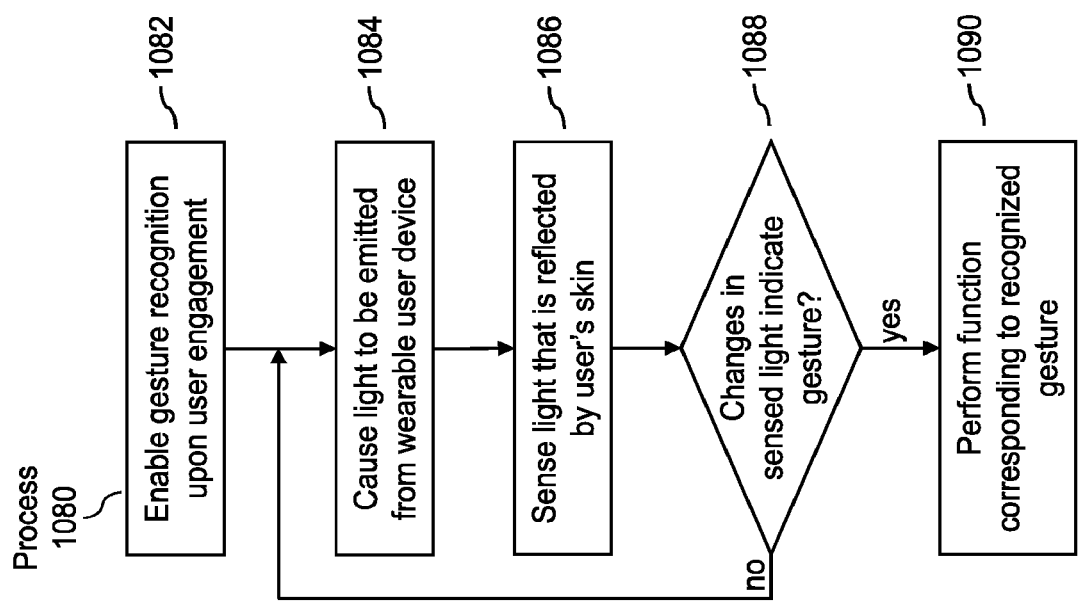
FIG. 10 illustrates an exemplary process for recognizing gestures using an optical sensor and performing functions corresponding to the recognized gestures.

FIG. 10 illustrates exemplary process 1080, which can be used according to various examples discussed herein for recognizing gestures using an optical sensor and performing functions corresponding to the recognized gestures. At block 1082, gesture recognition can be enabled upon user engagement with a wearable device. In some examples, light sources and an optical sensor integrated into a wearable device for gesture recognition can be disabled, kept off, or used for functions other than gesture recognition when deliberate gestures may be unlikely (e.g., when a wearer is not engaging the device, when no one is wearing the device, when a wearer is running, etc.). Disabling gesture recognition using the light sources and optical sensor can conserve battery power, avoid false gesture detection, free them to be used for other functions, or the like.

Upon recognizing that a user is engaged with a device, gesture recognition can be automatically enabled (e.g., the light sources and optical sensor can be enabled for recognizing gestures). A variety of methods can be used to recognize that a user is engaged with a wearable device. For example, other sensors in the wearable device can be used to detect that a user has raised the wearable device, angled it toward the user's face, and is looking at the display (e.g., using an accelerometer, gyroscope, camera, proximity sensor, light sensor, or the like). In another example, a user can press a button, touch a touchscreen, say a command, shake the device, or the like to commence engagement with the wearable device. In yet another example, sensors in the wearable device can be used to detect that a user is both not moving and actively looking at the display before enabling active gesture recognition, as movement could lead to artifacts and false gesture detection. In still other examples, light sources and an optical sensor can be enabled at times when a user is not engaging the device, but signals generated by the optical sensor can be ignored or discarded until user engagement is detected.

At block 1084, light can be caused to be emitted from a wearable user device (e.g., as described with reference to block 972 of process 970). At block 1086, light can be sensed that is reflected by a user's skin (e.g., as described with reference to block 974 of process 970). At block 1088, a determination can be made as to whether changes in sensed light indicate a deliberate user gesture (e.g., a gesture intended to cause a functional response by the wearable device). For example, a deliberate gesture can be recognized from a raw optical sensor signal (e.g., as discussed with reference to FIG. 6), or from the derivative of an optical sensor signal (e.g., as discussed with reference to FIG. 7 or FIG. 8).

If no gesture is indicated by changes in sensed light (e.g., the "no" branch of block 1088), light can again be caused to be emitted at block 1084 and reflected light can again be sensed at block 1086. In some examples, polling cycles can be repeated of causing light to be emitted and sensing reflected light to determine whether a user has performed a deliberate gesture. Consecutive polling cycles can be separated by a time interval, or they can be continuous until a gesture is detected or another event breaks the cycle (e.g., device powers off, user engagement terminates, a timeout interval passes, etc.).

If a gesture is indicated by changes in sensed light (e.g., the "yes" branch of block 1088), a function corresponding to the recognized gesture can be performed at block 1090. For example, a particular recognized gesture can indicate a user's desired intent to answer an incoming call, so the function of answering the incoming call can be performed. In other examples, recognized gestures in other contexts can correspond to a variety of other functions that can be performed upon recognizing a user's deliberate gesture (e.g., navigate forward, navigate backward, pause music, open a notification, etc.). In some examples, after performing the function corresponding to the recognized gesture at block 1090, gesture recognition can continue (e.g., at block 1084) to allow a user to continue interacting with a wearable device using gestures. In other examples, gesture recognition can be disabled upon performance of a function at block 1090, or when the wearable device is powered off, a user ceases to engage the device, a timeout interval passes, or the like.

Although various examples herein demonstrate how gesture recognition can be used to interact with a wearable device, it should be understood that gesture recognition can be used to interact with other devices as well. In some examples, a user can effectively generate commands using gestures that a wearable device can communicate to any of a variety of other devices, such as a mobile phone, television, audio system, media player, game console, lighting system, security system, tablet computer, or the like. For example, a wearable device can be in communication with a media player (e.g., via Wi-Fi, Bluetooth, the Internet etc.), and the wearer can perform a recognizable gesture. In response to recognizing the gesture, the wearable device can transmit a corresponding command to the media player, such as navigate through a menu, pause playback, select content for display, or the like. In another example, a wearable device can be in communication with a mobile telephone (e.g., via Bluetooth), and the wearer can perform a recognizable gesture. In response to recognizing the gesture, the wearable device can transmit a corresponding command to the mobile telephone, such as answer a phone call, silence a ringtone, emit a sound to help locate the phone, or the like. It should be understood that gesture recognition can be employed for still many other device-to-device interactions.

In addition, although various examples herein demonstrate how gesture recognition can be achieved using a light source and an optical sensor, it should be understood that various other sensors and elements can be used in conjunction with a light source and an optical sensor to recognize deliberate user gestures for interacting with a wearable device. For example, accelerometers and/or gyroscopes can be used to detect movement and determine whether optical sensor signals represent deliberate gestures instead of artifacts of other random user movements. Similarly, certain gestures can yield unique optical sensor signals concurrently with unique accelerometer and/or gyroscope signals, and the simultaneously occurrence of a combination of such signals can be used to positively recognize a deliberate gesture. In other examples, other device elements, sensors, and signal combinations can be used to avoid false gesture detection and correctly recognize deliberate user gestures.

Figure 11:
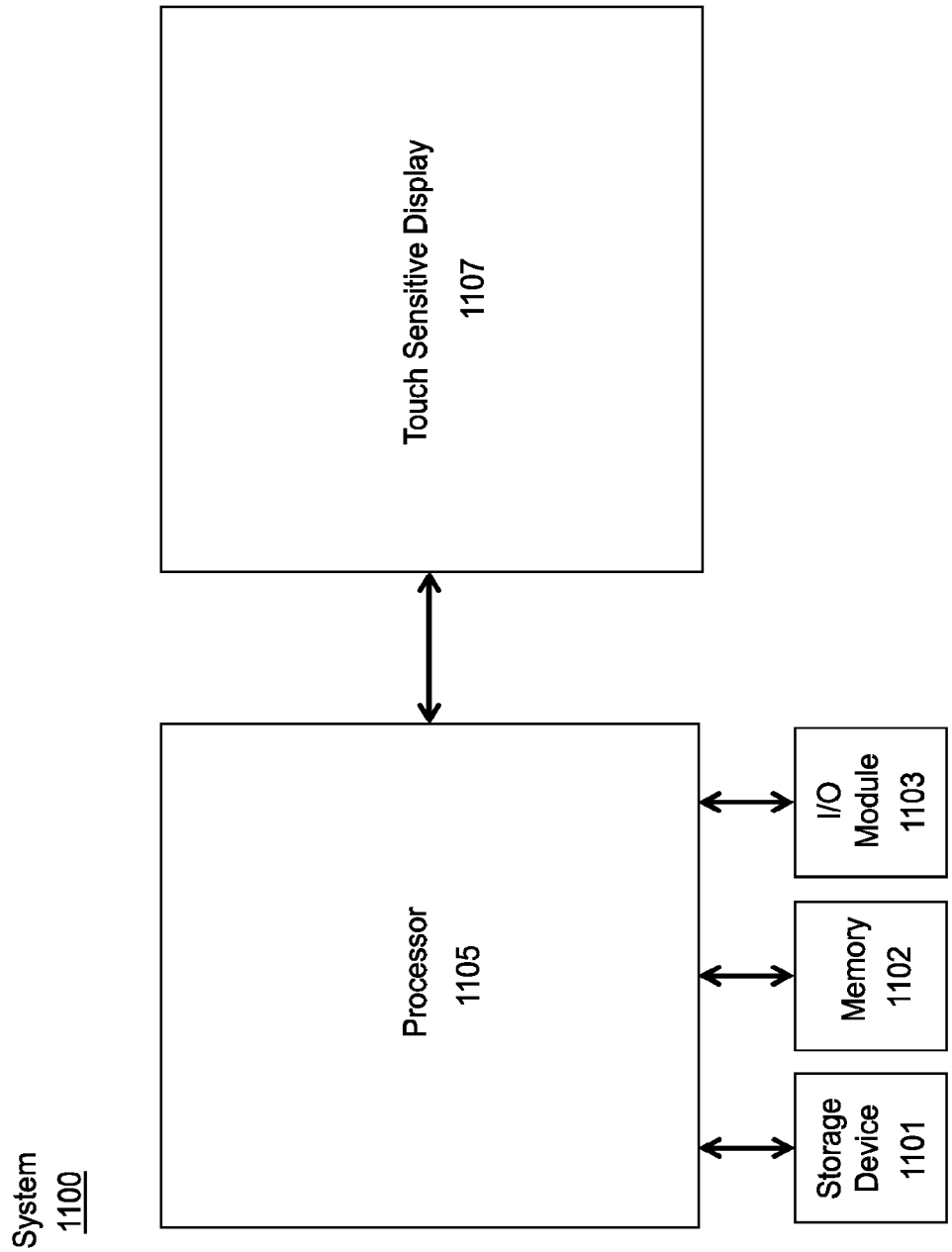
FIG. 11 illustrates an exemplary system for detecting gestures.

One or more of the functions described above relating to determining gestures can be performed by a system similar or identical to system 1100 shown in FIG. 11. System 1100 can include instructions stored in a non-transitory computer readable storage medium, such as memory 1102 or storage device 1101, and executed by processor 1105. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such as CD, CD-R, CD-RW, DVD, DVD-R, or DVD-RW, flash memory such as compact flash cards, secured digital cards, USB memory devices, memory sticks, and the like, or any type of database.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

System 1100 can also include an input/output ("I/O") module, such as I/O module 1103, which can enable processor 1105 to communicate with other components of system 1100 as well as peripherals, devices, servers, databases, and the like. For example, I/O module 1103 can include a transceiver, radio, modem, or the like that can enable processor 1105 to communicate with an external device through wired or wireless communication means, including LAN, WAN, Wi-Fi, Bluetooth, cellular, or the like.

System 1100 can further include touch sensitive display 1107 coupled to processor 1105 for detecting touch and displaying information. It is to be understood that the system is not limited to the components and configuration of FIG. 11, but can include other or additional components in multiple configurations according to various examples. Additionally, the components of system 1100 can be included within a single device, or can be distributed among multiple devices. In some examples, processor 1105 can be located within touch sensitive display 1107.

Therefore, according to the above, some examples of the disclosure are directed to a computer-implemented method for determining gestures, the method comprising: causing light to be emitted from a wearable user device; sensing a portion of the light that is reflected by a wearer's skin; and determining a gesture made by the wearer based on changes in the sensed portion of the light. Additionally or alternatively to one or more of the examples disclosed above, in some examples the changes in the sensed portion of the light correspond to a change in a distance between an optical sensor of the wearable user device and the wearer's skin; and sensing the portion of the light that is reflected by the wearer's skin comprises sensing the portion of the light using the optical sensor. Additionally or alternatively to one or more of the examples disclosed above, in some examples the changes in the sensed portion of the light correspond to a change in an intensity of the sensed portion of the light reflected by the wearer's skin. Additionally or alternatively to one or more of the examples disclosed above, in some examples causing the light to be emitted from the wearable user device comprises: causing the light to be emitted from a first LED at a first wavelength and a second LED at a second wavelength that is different from the first wavelength. Additionally or alternatively to one or more of the examples disclosed above, in some examples causing the light to be emitted from the wearable user device comprises: causing the light to be emitted at an angle relative to the wearable device, wherein the emitted light is incident on the wearer's skin at a non-perpendicular angle. Additionally or alternatively to one or more of the examples disclosed above, in some examples sensing the portion of the light that is reflected by the wearer's skin comprises: generating a signal based on the sensed portion of the light using an optical sensor positioned between a first LED and a second LED; and causing the light to be emitted from the wearable user device comprises causing the light to be emitted from the first LED and the second LED. Additionally or alternatively to one or more of the examples disclosed above, in some examples determining the gesture based on changes in the sensed portion of the light comprises: identifying a positive peak, a negative peak, and a zero crossing in a derivative of a signal generated by an optical sensor used for sensing the portion of the light that is reflected by the wearer's skin. Additionally or alternatively to one or more of the examples disclosed above, in some examples the gesture comprises a first clench.

According to the above, other examples of the disclosure are directed to a non-transitory computer-readable storage medium comprising computer-executable instructions for performing any of the methods described above; and a database can be coupled to the non-transitory computer-readable storage medium, wherein the database comprises gesture recognition data.

According to the above, other examples of the disclosure are directed to a system comprising: the non-transitory computer-readable storage medium discussed above; and a processor capable of executing the computer-executable instructions.

According to the above, other examples of the disclosure are directed to a wearable device for determining gestures, the device comprising: a light source configured to emit light from the device toward a wearer's skin when the wearable device is worn; an optical sensor configured to generate a signal based on sensing a portion of the light reflected by the wearer's skin; a non-transitory computer-readable storage medium comprising computer-executable instructions for determining a gesture made by the wearer based on changes in the signal; and a processor coupled to receive the signal, wherein the processor is capable of executing the computer-executable instructions. Additionally or alternatively to one or more of the examples disclosed above, in some examples the changes in the signal correspond to a change in a distance between the optical sensor and the wearer's skin. Additionally or alternatively to one or more of the examples disclosed above, in some examples the signal generated by the optical sensor changes based on an intensity of the sensed portion of the light reflected by the wearer's skin. Additionally or alternatively to one or more of the examples disclosed above, in some examples the light source comprises a first LED configured to emit light at a first wavelength and a second LED configured to emit light at a second wavelength that is different from the first wavelength. Additionally or alternatively to one or more of the examples disclosed above, in some examples the light source comprises a first LED and a second LED; and the optical sensor is positioned between the first LED and the second LED. Additionally or alternatively to one or more of the examples disclosed above, in some examples the light source is angled relative to the wearable device to direct light to be incident on the wearer's skin at a non-perpendicular angle. Additionally or alternatively to one or more of the examples disclosed above, in some examples the computer-executable instructions for determining the gesture comprise computer-executable instructions for determining the gesture by identifying a positive peak, a negative peak, and a zero crossing in a derivative of the signal. Additionally or alternatively to one or more of the examples disclosed above, in some examples the gesture comprises a first clench. Additionally or alternatively to one or more of the examples disclosed above, in some examples the optical sensor is configured to sense a wavelength of light that corresponds to a wavelength of light emitted by the light source.

According to the above, other examples of the disclosure are directed to a system for determining gestures, the system comprising: a light source configured to emit light from a wearable user device toward a wearer's skin when the wearable user device is worn; an optical sensor configured to generate a signal based on sensing a portion of the light reflected by the wearer's skin; a non-transitory computer-readable storage medium comprising computer-executable instructions for determining a gesture made by the wearer based on changes in the signal; a processor coupled to receive the signal, wherein the processor is capable of executing the computer-executable instructions; and a communication module coupled to the processor, wherein the communication module is configured to communicate with a mobile device. Additionally or alternatively to one or more of the examples disclosed above, in some examples the non-transitory computer-readable storage medium further comprises instructions for communicating a command to the mobile device via the communication module in response to determining the gesture.

According to the above, other examples of the disclosure are directed to a computer-implemented method for indirectly determining a hand gesture using a wearable device worn on a wearer's wrist, the method comprising: causing light to be emitted toward the wearer's wrist from a light source of the wearable device, wherein the light source is positioned proximate to skin at the wearer's wrist; sensing a portion of the light that is reflected by the skin at the wearer's wrist using an optical sensor of the wearable device, wherein the optical sensor is positioned proximate to the skin at the wearer's wrist; indirectly determining a hand gesture made by the wearer based on a change in the sensed portion of the light that is reflected by the skin at the wearer's wrist, wherein the change results from a distance between the optical sensor and the skin at the wearer's wrist increasing or decreasing due to the hand gesture. Additionally or alternatively to one or more of the examples disclosed above, in some examples the distance between the optical sensor and the skin at the wearer's wrist increases or decreases less than ⅛th of an inch due to the hand gesture. Additionally or alternatively to one or more of the examples disclosed above, in some examples the change in the sensed portion of the light corresponds to an intensity of the sensed portion of the light increasing or decreasing based on the increasing or decreasing distance between the optical sensor and the skin at the wearer's wrist. Additionally or alternatively to one or more of the examples disclosed above, in some examples indirectly determining the hand gesture made by the wearer comprises: sensing the change in the sensed portion of the light that is reflected by the skin at the wearer's wrist without directly sensing hand movement of the wearer.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:

1. A wearable device:
   a housing having a transparent window;
   a first light source disposed in the housing and configured to emit a first light toward a wearer of the wearable device;
   a second light source disposed in the housing and configured to emit a second light toward the wearer;
   an optical sensor disposed in the housing, positioned between the first light source and the second light source: and
      operable to receive returns of both the first light and the second light from the wearer; and
   a processor operable to generate, using the received returns of the first light and the second light, one or more signals; wherein,
      the first light source and the second light source are configured to emit the first light and the second light through the transparent window;
      the optical sensor is configured to receive the returns of the first light and the second light through the transparent window;
      after generating the one or more signals, the processor is operable to identify each of a positive peak, a negative peak, and a zero crossing in a derivative of the one or more signals; and the processor is operable to determine a gesture of the wearer using the identified each of the positive peak, the negative peak, and the zero crossing in the derivative of the one or more signals.

2. The wearable device of claim 1, wherein the returns of the first light and the second light are reflected light from the wearer.

3. The wearable device of claim 2, wherein the one or more signals changes based on an intensity of a sensed portion of the light reflected by the wearer.

4. The wearable device of claim 1, wherein the first light source comprises a first LED configured to emit light at a first wavelength and the second light source comprises a second LED configured to emit light at a second wavelength that is the same as the first wavelength.

5. The wearable device of claim 1, wherein the emitted first and second light are incident on the wearer at a perpendicular angle relative to the wearable device.

6. The wearable device of claim 1, wherein the emitted first and second light are incident on the wearer at a perpendicular angle relative to the wearer.

7. A method of monitoring a wearer, comprising:

emitting, from a first light source, a first light toward the wearer of a wearable device;

emitting, from a second light source, a second light toward the wearer of the wearable device;

receiving, by an optical sensor positioned between the first light source and the second light source, reflected first and second light from the wearer;

generating, using the received first light and the second light from the wearer, one or more signals;

after generating the one or more signals, identifying each of a positive peak, a negative peak, and a zero crossing in a derivative of the one or more signals; and determining a gesture of the wearer, using the identified at least one of the positive peak, the negative peak, and the zero crossing in the derivative of the one or more signals.

8. The method of claim 7, further comprising:

generating a first signal from the first light source and a second signal from the second light source for use in determining the gesture of the wearer.

9. The method of claim 7, wherein receiving the reflected first and second light from the wearer comprises:

sensing changes in the reflected first and second light that correspond to a change in an intensity of the light reflected by the wearer.

10. The method of claim 7, further comprising:

causing the light to be emitted at a perpendicular angle relative to the wearer.

11. The method of claim 7, further comprising:

generating signals based on an intensity of the received reflected first and second light reflected by the wearer.

12. A computer-implemented method for determining that a wearer of a wearable device is engaged in an activity, the method comprising:

causing a first light to be emitted toward the wearer from a first light source of the wearable device and a second light to be emitted toward the wearer from a second light source of the wearable device, wherein an optical sensor is positioned between the first light source and the second light source;

sensing the first and second light, with the optical sensor, that is reflected by the wearer through a surface of a housing, wherein the optical sensor, the first light source and the second light source are disposed in the housing;

generating, using the received first light and the second light from the wearer, one or more signals;

after generating the one or more signals, identifying each of a positive peak, a negative peak, and a zero crossing in a derivative of the one or more signals; and determining a gesture of the wearer, using the identified each of the positive peak, the negative peak, and the zero crossing in the derivative of the one or more signals.

13. The computer-implemented method of claim 12, further comprising:

generating signals based on an intensity of the sensed first and second light reflected by the wearer.

14. The computer-implemented method of claim 12, further comprising:

causing the first and second light source to emit light at alternating intervals to form the emitted first and second light.

15. The computer-implemented method of claim 12, wherein the generated signal changes based on an intensity of the sensed first and second light reflected by the wearer.

* * * * *